United States Patent [19]

DePasquale et al.

[11] E Patent Number: Re. 33,759

[45] Reissued Date of Patent: Dec. 3, 1991

[54] AQUEOUS SYSTEMS CONTAINING SILANES FOR RENDERING MASONRY SURFACES WATER REPELLANT

[75] Inventors: Ralph J. DePasquale, Milan, Italy; Michael E. Wilson, Middleburg, Fla.

[73] Assignee: PCR Group, Inc., Gainesville, Fla.

[21] Appl. No.: 321,845

[22] Filed: Mar. 10, 1989 (Under 37 CFR 1.47)

Related U.S. Patent Documents

Reissue of:

[64] Patent No.: 4,648,904
Issued: Mar. 10, 1987
Appl. No.: 829,530
Filed: Feb. 14, 1986

[51] Int. Cl.[5] ..... C09D 5/20

[52] U.S. Cl. ..... 106/2; 106/287.11; 106/287.14; 106/287.16

[58] Field of Search ..... 106/287.12-287.16, 106/2; 427/337; 556/463

[56] References Cited

U.S. PATENT DOCUMENTS

| | | | |
|---|---|---|---|
| 4,277,382 | 7/1981 | Lin et al. | 525/477 |
| 4,433,013 | 2/1984 | Puhringer | 427/337 |
| 4,476,282 | 10/1984 | Koerner et al. | 524/588 |
| 4,496,687 | 1/1985 | Okada et al. | 524/195 |
| 4,517,375 | 5/1985 | Schmidt | 556/463 |

FOREIGN PATENT DOCUMENTS

| | | |
|---|---|---|
| 2800016 | 7/1979 | Fed. Rep. of Germany . |
| 1502322 | 3/1978 | United Kingdom . |

*Primary Examiner*—Mark L. Bell

[57] ABSTRACT

There is provided an aqueous emulsion of (a) a hydrolyzable silane having the general formula:

$$R_n—Si—(R')_{4-n}$$

wherein R is a hydrocarbyl group containing from 1 to 20 carbon atoms, R' is a hydrolyzable group and n is 1 or 2, and oligomers thereof, e.g., dimers and trimers, and other oligomers, (b) an emulsifying agent having an HLB value of from 4 to 15, and (c) water.

27 Claims, No Drawings

AQUEOUS SYSTEMS CONTAINING SILANES FOR RENDERING MASONRY SURFACES WATER REPELLANT

Matter enclosed in heavy brackets [ ] appears in the original patent but forms no part of this reissue specification; matter printed in italics indicates the additions made by reissue.

This invention relates to water based systems which are especially useful in rendering porous masonry surfaces water repellant. More particularly, the present invention relates to aqueous emulsions of hydrolyzable silanes, and/or oligomers thereof, useful in treating masonry surfaces to render such surfaces water repellant.

BACKGROUND OF THE INVENTION AND PRIOR ART

The utility of alkoxysilanes as masonry water repellants (MWR) is widely known. Compositions currently in use employ solutions of silanes in various solvents such as alcohol (U.S. Pat. No. 3,772,065 dated 13 Nov. 1973 and U.S. Pat. No. 4,342,796 dated 3 Aug. 1982) or hydrocarbons (U.S. Pat. No. 4,525,213 dated 25 June 1985). Principle limitations of the solvent type compositions include the toxicity and flammability of the solvents employed. In the case of the low molecular weight alcohols, e.g., isopropanol, the rapid evaporation rate limits the extent of penetration and curing of the silane in the substrate. Reference may also be had to U.S. Pat. No. 2,683,674 dated 13 July 1954 showing the use of alkyl polysiloxanes in a volatile solvent solution.

Aqueous solutions of hydrolyzed silanes have been reported as effective masonry water repellant compositions. (See U.S. Pat. No. 4,517,375 dated 14 May 1985).

Aqueous emulsions of organopolysiloxane oils (See U.S. Pat. No. 4,476,282 dated 9 Oct. 1984) and an aqueous dispersion of silicone resins (See U.S. Pat. No. 4,529,758 dated 16 July 1985) have also been reported. These materials are quite different from the silane compositions of the present invention. There is a need for a water based composition which is stable for a long period of time and which is highly effective as a masonry water repellant composition.

By the term "masonry" as used herein, is meant any porous inorganic substrate, particularly building compositions and including but not limited to structural ceramics such as common brick, paving brick, face brick, sewer pipe, drain tile, hollow block, terra cotta, conduits, roofing tile, flue lining, cements and plastics such as Portland cement, calcined gypsum products, i.e., molding and building plaster and stucco, magnesia cement, isulation products such as electrical insulators, porcelain spark plugs, etc., thermal and insulators (diatomaceous earth brick). The present invention is particularly applicable to masonary, i.e., to all articles and architecural structures such as porous ceramic materials including stone, brick, tile, artificial stone, abode, etc., and to ceramic articles, particularly masonry units, e.g., brick, pieces of stone, etc., which are generally held together or made a single mass by mortar, plaster or earth.

The masonry materials also include concrete and reinforced concrete such as found in roadways, bridge decks, airport runways, parking garage decks, and other concrete building structures.

The masonry materials which can be treated in accordance herewith are preferably dry when treated with the waterproofing compositions, although they may be wet. In the case of settable masonry materials, the compositions of the present invention may be incorporated in the preset mixture, for example, into a concrete mix prior to casting and setting.

BRIEF STATEMENT OF THE INVENTION

Briefly stated, the present inventions is in an aqueous silane emulsion useful as a porous masonry water repellant composition which comprises (a) from about 1% to about 40% by weight of an alkoxysilane having the general formula $R_n$—Si—$(R')_{4-n}$ wherein R is a $C_1$–$C_{20}$ hydrocarbyl or halogenated hydrocarbyl group, R' is a hydrolyzable group such as $C_1$–$C_3$ alkoxy, or halide, or amino, or carboxylate and n is 1 or 2, or dimers or trimers (oligomers) thereof, (b) from 0.5 to 50% by weight of the silane component of an emulsifier having an HLB value of from 4 to 15, and (c) water.

DETAILED DESCRIPTIONS OF THE INVENTION AND SPECIFIC EXAMPLES

As indicated above, the water based compositions of the present invention include (a) an alkoxysilane having the general formula of: $R_n$—Si—$(R')_{4-n}$ wherein R is a $C_1$–$C_{20}$ hydrocarbyl group or halogenated hydrocarbyl group desirably a $C_1$–$C_{10}$ alkyl group and preferably a $C_4$–$C_{10}$ alkyl group. *Compositions wherein R is a $C_8$–$C_{20}$ hydrocarbyl or halogenated hydrocarbyl group have stability for months against phase separation.* The hydrocarbyl group consists of hydrogen and carbon atoms and may be aliphatic or alkyl (the latter being preferred), or cycloaliphatic or cycloalkyl, or aryl, or aralkyl. These hydrocarbyl radicals may also contain as substituent groups, halogen, e.g., chlorine, bromine, or fluorine, or nitrogen or oxygen or sulfur heteroatoms. One or more halogen substituents may be present in the R group. The R' group is a $C_1$–$C_3$ alkoxy, halogen, amino, or carboxylate group. Thus, the alkyl groups useful as R' are methyl, ethyl, n-propyl, and isopropyl. As indicated, n may be 1 or 2 and thus, monohydrocarbyl substituted alkoxysilanes and dihydrocarbyl substituted alkoxysilanes are contemplated by the present invention. The active ingredients of the present invention do undergo hydrolysis to a surprisingly small extent in the presence of water, and thus there may also be present in the compositions, either by intention or by accident, dimers and trimers, or other oligomers of the alkoxysilanes.

The second important ingredient is an emulsifier present in an amount ranging from 0.5 to 50% by weight of the silane component. These emulsifiers have an HLB value of from 4 to 15 and are generally of the polyhydroxy type. The third ingredient is water.

The Hydrolyzable silanes

The silanes useful in accordance with the present invention generally have a molecular weight in excess of 135 and preferably greater than 190 up to about 500 for the monomers. The dimers and trimers present in the composition will, of course, have multiply higher molecular weights than the single specie of silanes being used. It should also be noted that mixtures of various silanes may be used, if desired.

Specific examples of silanes useful in accordance with the present invention include, therefore, methyltrimethoxysilane, methyltriethoxysilane, methyltri-n-propoxysilane, ethyltrimethoxysilane, ethyltriethoxysilane, ethyltri-n-propoxysilane, propyltriethoxysilane, propytridimethylaminosilane, propyltri-n-propoxysilane, butyltrimethoxysilane, butyltriethoxysilane, dibutyldimethoxysilane, isobutyltrimethoxysilane, isobutyltriacetoxylsilane, di-isobutyldimethoxysilane, isobutyltriethoxysilane, n-hexyltrimethoxysilane, 6-chloro-hexyltrimethoxysilane, 6,6,6-trifluorohexyltrimethoxysilane, cyclohexyltrimethoxysilane, benzyltrimethoxysilane, 4-chlorobenzyltriethoxysilane, 4-bromobenzyltri-n-proxpoxysilane, phenyltrimethoxysilane, phenyltriethoxysilane, octyltrimethoxysilane, octyltriethoxysilane, octyltrichlorosilane, octylmethyldiisopropoxysilane, lauryltrimethoxysilane, 2-ethylhexyltrimethoxysilane, 4-chlorobenzyltrimethoxysilane, decyltrimethoxysilane, dodecyltrimethoxysilane, dodecyltribromosilane, tetradecyltriethoxysilane, hexadecyltriethoxysilane, octadecyltriethoxysilane, eicosyltrimethoxysilane, etc., alone and in admixture which the dimers, trimers and other oligomers thereof.

The Emulsifiers

A wide variety of ionic and nonionic emulsifiers have been tried and have been found to be useful in the present invention. The desired emulsifiers are, however, nonionic and preferably polyhydroxy materials. Nonionic, anionic, cationic and ampholytic emulsifiers are well known from the state of the art. The concentration of the emulsifier used in accordance with the present invention may range from 0.5 to 50% by weight of the silane and preferably in the range from 1 to 20% by weight of the silane. The concentration and choice of emulsifier or emulsifier blend is highly dependent on the silane or silane mixture being used.

In general, those emulsifiers or emulsifier blends which have an HLB value in the range from about 2 to about 20, and preferably in the range from 4 to 15 may be used herein. The proper HLB value for a given silane or silane mixture must be determined experimentally in order to ascertain the optimum stability.

Specific examples of emulsifying agents which may be used in accordance herewith include the following with the HLB value given in parenthesis following the name. Sorbitantrioleate (1.8) sorbitantristearate (2.1), polyoxyethylene sorbitolhexastearate (2.6), glycerol monostearate (3.8), sorbitan monooleate (4.3), sorbitan monostearate (4.7), polyoxyethylene (2 mol) stearyl ether (4.9), sorbitan monopalmitate (6.7), polyoxypropylene mannitoldioleate (8), polyoxyethylene sorbitololeate (9.2), polyoxyethylene stearate (9.6), polyoxyethylene sorbitanmonooleate (10.0), polyoxyethylene monooleate (11.4), polyoxyethylene (6 mol) tridecylether (11.4), polyoxyethylene (10 mol) cetylether (12.9), polyoxyethylene sorbitan monooleate (15), polyoxyethylene (20 mol) stearylether (15.3), polyoxyethylene (15 mol) tridecylether (15.4), polyoxyethylene alkylamine (cationic, 15.5), polyoxyethylene alcohols having HLB of 9.7, about 10, and 11.6, ethoxylated nonylphenols having HLB values of 10, 11, and 12; dialkylphenolethoxylates having a HLB value of 10.6, block copolymers of ethylene oxide and propylene oxide having a HLB values in the range 5.5 to 15, fatty acid glycerides having HLB values of approximately 4.

The preferred surfactants or emulsifiers are the "Spans" which are sorbitan fatty acid esters having HLB values in the range from 4.3 to 8.6 and the Tweens 61 and 81 which are polyoxyethylene sorbitan fatty acid esters having HLB values in the range from 9.6 to 11.4. These preferred emulsifying agents maintain stable emulsions of the silanes for periods more than two months.

The following Table I lists various useful surfactants by class name and specific examples of commercial products.

TABLE I

| TYPE OF SURFACTANT | EXAMPLES (SUPPLIER, HLB) |
|---|---|
| Polyoxyethylene alcohols | Brij 30 (ICI Americas; 9.7) |
| | Tergitol 15-S-3 (Union Carbide approx. 10) |
| | Triton DF 16 (Rohm & Hass; 11.6) |
| Ethoxylated nonyl phenols | NP-6 (Union Carbide; 11) |
| | NP-7 (Union Carbide; 12) |
| | CO-520 (GAF; 10) |
| Dialkyl phenol ethoxylate | DM-530 (Gaf; 10.6) |
| Block copolymers of ethylene oxide and propylene oxide | Pluronics (BASF) |
| | L42 (8), L62 (7), L64 (15) |
| | L72 (6.5), L92 (5.5), 25R2 (6.3) |
| | Tetronic 702 (BASF; 7) |
| Fatty acid glycerides | Arlacel 165 (ICI Americas; 4) |
| Sorbitan fatty acid esters | Spans (ICI Americas) |
| | 20 (8.6), 40 (6.7), 60 (4.7) |
| | 80 (4.3) |
| Polyoxyethylene sorbitan fatty acid esters | Tween 61 (ICI Americas; 9.6) |
| | Tween 81 (ICI Americas, 10.0) |
| | Atlas G-1096 (ICI Americas; 11.4) |
| Blends of sorbitan esters with polyoxethylene amines | Atlas G-2090 (ICI Americas) |
| Amphoteric | Atlas G-271 (ICI Americas) |
| Polyvinylalcohol | (Air Products and Chemicals, Inc.) |

The following specific example is illustrative of the manner of making the compositions of the present inventions.

To a magnetically stirred mixture of 20 grams of octyltriethoxysilane and 3 grams of Span 60 (sorbitan monooctadecanoate) (Chemical Abstract Registry Number 1338-39-2) obtained from ICI Americas was slowly added 77 grams of water producing a stable milky emulsion. After standing for 3 weeks, the flash point was 180° F.

20% solutions of the silane in mineral spirits and an isopropanol were prepared for comparison.

Concrete cubes two inches on the side were treated at the rate of 125 square feet per gallon with each mixture and allowed to cure at 72° and 50% relative humidity for two weeks. The blocks were then immersed in water, and after three weeks the weight gain was measured. The mineral spirits and the isopropanol alcohol silane solutions reduced the weight gain over an untreated control by 70% and an aqueous emulsion composition of the present invention reduced the weight gain also by 70%. This compares very favorably with the results obtained from solutions at similar concentrations of alkoxysilanes in other solvents such as mineral spirits, alcohol, etc. The extreme advantage is that the medium in which the salines are carried is an aqueous medium having far more highly acceptable environmental impact than solvents now in commercial use.

As further examples of the practice of the present invention, concrete cubes 2 inches on the side were conditioned in a control room at 73° F. and 50% relative humidity for 21 days to give a constant weight. Each solution of masonry water repellent composition was applied to two cubes at the rate of 125 square feet per gallon (3.07 square meters per liter), and the coated cubes were cured on a rack in a control room for 13 days prior to recording the initial weight of each cube. All of the cubes including two untreated control cubes were placed on a rack and immersed in a distilled water bath. After 21 days of immersion, the cubes were removed, blotted dry and immediately weighed. The percent weight gain of each block was determined by $$\frac{W_{final} - W_{initial}}{W_{initial}} \times 100 = \% \text{ Weight Gain}$$

The reduction of weight gain was calculated by the formula:

$$100 \times \left( \frac{(\% \text{ Weight Gain of Control}) - (\% \text{ Weight Gain of Sample})}{(\% \text{ Weight Gain of Control})} \right) = \text{Reduction of Weight Gain}$$

The higher reduction of weight gain values indicate more effective masonry water repellants.

The aqueous masonry water repellant emulsions were prepared as follows: In a four ounce bottle containing a magnetic stir bar were placed 10 grams of the silane (for a 20% emulsion) and 1.5 grams of the emulsifier (for a 3% loading). The mixture was vigorously stirred while 38.5 grams of water were added slowly over 5 to 10 minutes. Then the emulsion was stirred for an additional 20 minutes. Emulsions prepared in this manner maintained a uniform milky appearance with little or no phase separation for several months.

Examples 1 to 6 are listed in Table 2 below.

TABLE 2

RESULTS OF CONCRETE WATER ABSORPTION USING AQUEOUS MWR EMULSIONS

| SILANE | SOLVENT | SURFACTANT | ADDITIVE | REDUCTION OF WEIGHT GAIN |
|---|---|---|---|---|
| (1) 20% Octyltriethyoxysilane | Mineral Spirits | None | None | 70% |
| (2) 20% Octyltriethoxysilane | Water | 3% Span 20[a] | None | 60% |
| (3) 20% Octyltriethoxysilane | Water | 3% Span 20[a] | 0.5% Acetic Acid | 65% |
| (4) 20% Octyltriethoxysilane | Water | 3% Span 20[a] | 1.0% $NEt_3$ | 62% |
| (5) 20% Ocytriethoxysilane | Water | 3% Span 60[a] | None | 70% |
| (6) 20% Octyltriethoxysilane | Water | 3% Tween 81[a] | None | 62% |

[a]Trademark of ICI Americas Corp.

When isobutyltrimethoxysilane, octadecyltriethoxysilane, the tall oil fatty acid amide ($C_{18}$) of 3-aminopropyltriethoxysilane, and 4R-triethoxysilylmethene-1 are emulsified in manner indicated above and applied to concrete blocks, results similar to those obtained with octyltriethoxysilane as shown above are obtained.

The surprising feature of the compositions of the present invention is that the degree of hydrolytic condensation is so relatively low. It appears that the surfactants, especially the polyhydroxy type, e.g., the Spans and the Tweens, act as inhibitors of hydrolysis in the absence of an acid, or alkaline medium. However, in the acid or alkaline medium of the masonry, e.g., concrete, or the like, hydrolysis occurs readily with the desired chemical bonding with the substrate then occurring. In the environment of use, the hydrolysis proceeds readily with relatively slight evolution of the alcohol corresponding to the $C_1$–$C_3$ alkyl group. Thus, the amount of volatile solvent material, e.g., ethanol or chemical reactant released to the atmosphere by the use of the compositions of the present invention is severely restricted over that occurring with solvents currently in use. However, as will be seen from the table of results given above, the difference in water repellancy from known compositions is not too significant and well within experimental error.

As indicated above, these compositions may be applied to masonry substrates such as concrete highways, concrete bridge decks, concrete runways, concrete garage decks, concrete sidewalks, and the like, in the same manner as disclosed in the patent to Seiler U.S. Pat. 3,772,065, supra. Also, as indicated above, the compositions of the present invention may by applied to dry masonry surfaces or to wet masonry surfaces without apparent change in the effectiveness of the compositions as water repellant agents.

Other ingredients may be present in the compositions hereof such as antimicrobials, antifungal, anticorrosion agents, lubricants, odorants and fragrances, thickening agents, etc., in minor amounts insufficient to adversely affect the basic compositions, e.g., from 0.1% to 5% by weight.

What is claimed is:

1. An aqueous silane emulsion composition useful to render a [porous ceramic] *masonry* material water repellant which consists essentially of (a) from 1% to 40% by weight of hydrolyzable silane having a molecular weight up to about 500 and the general formula:

$$R_n—Si—(R')_{4-n}$$

wherein R is a $C_1$–$C_{20}$ hydrocarbyl or halogenated hydrocarbyl group, R' is $C_1$–$C_3$ alkoxy or halide or amino or carboxyl group, and n is 1 or 2, or oligomers thereof, (b) from 0.5 to 50% by weight of the silane component of an emulsifier having an HLB value of from 4–15, and (c) water.

2. An aqueous silane emulsion as defined in claim 1 wherein the silane is an alkylalkoxysilane.

3. An aqueous silane emulsion as defined in claim 1 wherein the silane is an alkyltrialkoxysilane.

4. An aqueous silane emulsion as defined in claim 1 wherein R is a $C_1$–$C_{10}$ alkyl group, R' is a $C_1$–$C_3$ alkoxy group and n is 1.

5. An aqueous silane emulsion as defined in claim 1 wherein R is a $C_4$–$C_{10}$ alkyl group.

6. An aqueous silane emulsion as defined in claim 1 wherein the silane is octyltriethoxysilane.

7. An aqueous silane emulsion as defined in claim 1 wherein the concentration of the silane is from 10% to 20% by weight.

8. An aqueous silane emulsion as defined in claim 1 wherein the emulsifier is a nonionic emulsifying agent.

9. An aqueous silane emulsion as defined in claim 1 wherein the emulsifier is a nonionic polyhydroxy compound.

10. An aqueous silane emulsion as defined in claim 1 wherein the emulsifier is a sorbitan fatty acid ester.

11. An aqueous silane emulsion as defined in claim 1 wherein the emulsifier is a polyoxyethylene sorbitan fatty acid ester.

12. An aqueous silane emulsion as defined in claim 1 wherein the silane is isobutyltrimethoxysilane.

13. An aqueous silane emulsion as defined in claim 1 wherein the silane is octadecyltriethoxysilane.

14. An aqueous silane emulsion as defined in claim 1 wherein the silane is 4R-triethoxysilylmenthene-1.

15. A process for increasing the resistance to penetration by aqueous media of masonry which comprises applying to the surface thereof an aqueous silane emulsion which consists essentially of (a) from 1% to 40% by weight of hydrolyzable silane having a molecular weight up to about 500 and the general formula:

$$R_n—Si—(R')_{4-n}$$

wherein R is a $C_1$–$C_{20}$ hydrocarbyl or halogenated hydrocarbyl group, R' is $C_1$–$C_3$ alkoxy, halide, amino, carboxylate, and n is 1 or 2, or oligomers thereof,* (b) from 0.5 to 50% by weight of the silane component of an emulsifier having an HLB value of from 4–15, and (c) water.

*16. An aqueous silane emulsion composition useful to render a masonry material water repellant which consists essentially of (a) from 1% to 40% by weight of hydrolyzable silane having a molecular weight up to about 500 and the general formula:*

$$R_n—Si—(R')_{4-n}$$

*wherein R is a $C_8$–$C_{20}$ hydrocarbyl or halogenated hydrocarbyl group, R' is a $C_1$–$C_3$ alkoxy or amino or carboxylate group, and n is 1 or 2, or oligomers thereof, (b) from about 1% to 50% by weight of the silane component of an emulsifier having an HLB value of from 4–15, and (c) water, said aqueous silane emulsion composition having stability against phase separation.*

*17. An aqueous silane emulsion as defined in claim 16 wherein the silane is an alkylalkoxysilane.*

*18. An aqueous silane emulsion as defined in claim 16 wherein the silane is an alkyltrialkoxysilane.*

*19. An aqueous silane emulsion as defined in claim 16 wherein the silane is an octyltriethoxysilane.*

*20. An aqueous silane emulsion as defined in claim 16 wherein the concentration of the silane is from 10% to 20% by weight.*

*21. An aqueous silane emulsion as defined in claim 16 wherein the emulsifier is a nonionic emulsifying agent.*

*22. An aqueous silane emulsion as defined in claim 16 wherein the emulsifier is a nonionic polyhydroxy compound.*

*23. An aqueous silane emulsion as defined in claim 16 wherein the emulsifier is a sorbitan fatty acid ester.*

*24. An aqueous silane emulsion as defined in claim 16 wherein the emulsifier is a polyoxyethylene sorbitan fatty acid ester.*

*25. An aqueous silane emulsion as defined in claim 16 wherein the silane is octadecyltriethoxysilane.*

*26. An aqueous silane emulsion as defined in claim 16 wherein the silane is 4R-triethoxysilylmenthene-1.*

*27. A process for increasing the resistance to penetration by aqueous media of masonry which comprises applying to the surface thereof an aqueous silane emulsion which consists essentially of (a) from 1% to 40% by weight of hydrolyzable silane having a molecular weight up to about 500 and the general formula:*

$$R_n—Si—(R')_{4-n}$$

*wherein R is a $C_8$–$C_{20}$ hydrocarbyl or halogenated hydrocarbyl group, R' is a $C_1$–$C_3$ alkoxy or amino or carboxylate group, and n is 1 or 2, or oligomers thereof, (b) from about 1% to 50% by weight of the silane component of an emulsifier having an HLB value of from 4–15, and (c) water, said aqueous silane emulsion having stability against phase separation.*

* * * * *